(12) United States Patent
Klein et al.

(10) Patent No.: US 8,601,649 B2
(45) Date of Patent: Dec. 10, 2013

(54) FASTENING CLIP

(75) Inventors: Jean Luc Klein, Ringendorf (FR); Michel Kuhm, Ingwiller (FR)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 132 days.

(21) Appl. No.: 13/125,987

(22) PCT Filed: Nov. 4, 2009

(86) PCT No.: PCT/EP2009/007909
§ 371 (c)(1),
(2), (4) Date: Jul. 5, 2011

(87) PCT Pub. No.: WO2010/051986
PCT Pub. Date: May 14, 2010

(65) Prior Publication Data
US 2012/0110796 A1 May 10, 2012

(30) Foreign Application Priority Data
Nov. 4, 2008 (FR) .................................. 08 06132

(51) Int. Cl.
*F16B 21/08* (2006.01)
(52) U.S. Cl.
USPC ................................ 24/457; 24/289; 24/297
(58) Field of Classification Search
USPC ........................................ 24/457, 289, 297
See application file for complete search history.

(56) References Cited

U.S. PATENT DOCUMENTS

| | | | |
|---|---|---|---|
| 3,422,395 A * | 1/1969 | Fisher | 439/889 |
| 4,920,618 A | 5/1990 | Iguchi | |
| 5,203,529 A * | 4/1993 | Penniman | 248/222.11 |
| 5,324,151 A | 6/1994 | Szudarek et al. | |
| 5,636,937 A * | 6/1997 | Zemlicka | 403/388 |
| 5,906,465 A * | 5/1999 | Sato et al. | 411/510 |
| 6,203,364 B1 * | 3/2001 | Chupak et al. | 439/527 |
| 6,994,504 B2 * | 2/2006 | Gordon | 411/508 |
| 7,534,134 B2 * | 5/2009 | Qiu | 439/527 |
| 2004/0016088 A1 * | 1/2004 | Angellotti | 24/297 |
| 2006/0117535 A1 | 6/2006 | Fraser et al. | |
| 2007/0102594 A1 * | 5/2007 | Geiger et al. | 248/71 |

* cited by examiner

*Primary Examiner* — Robert J Sandy
*Assistant Examiner* — David Upchurch
(74) *Attorney, Agent, or Firm* — Tarolli, Sundheim, Covell & Tummino LLP

(57) ABSTRACT

A clip (1) for fixing an element with a groove which is defined by two parallel hook-in edges, includes a tab (30) which is designed such that on two planes (35) and (36) which are parallel to each other it can cooperate with the groove. The tab (30) has a first surface (32) and a second surface (35). The first surface (32) extends completely set back with respect to the first plane (35) and in the thickness of the tab (30) to the second plane (36). The second surface (33) extends completely protruding from the second plane (36) to the outside of the tab (30) and opposite the first surface (32). The first surface (32) and the second surface (33) define an elastically deformable region. The volume defined by the second surface (33) and the second plane (36) is smaller than the volume defined by the first surface (32) and the first plane (35) or is equal to the same.

10 Claims, 2 Drawing Sheets

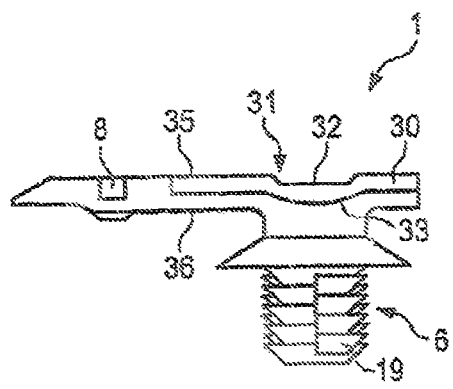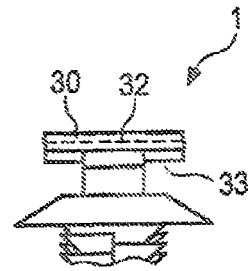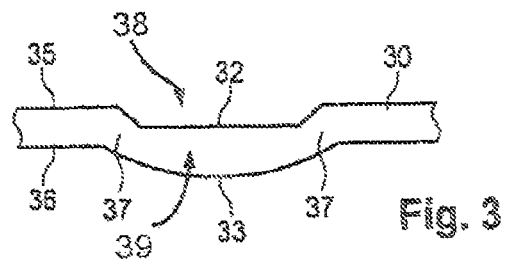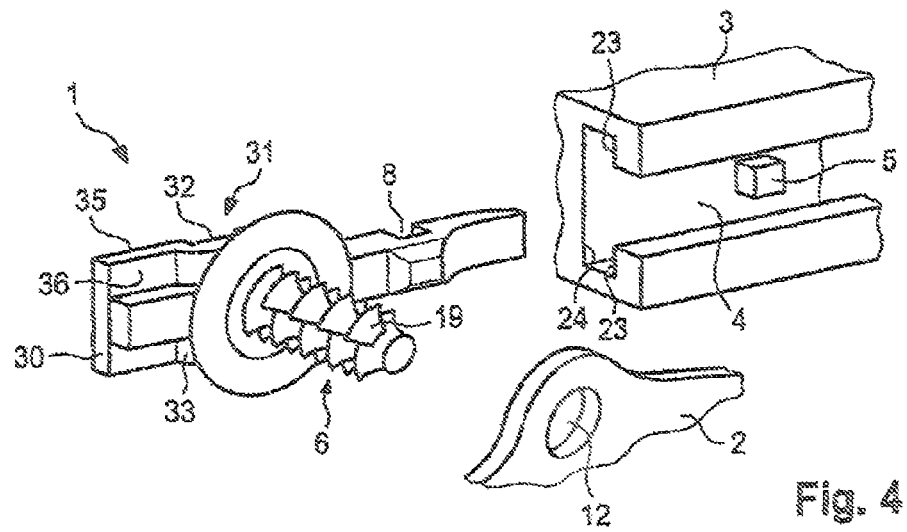

FASTENING CLIP

RELATED APPLICATION

This application corresponds to PCT/EP20091007909, filed Nov. 4, 2009, which claims the benefit of French application Ser. No. 08/06132, filed Nov. 4, 2008, the subject matter, of which is incorporated herein by reference in their entirety.

BACKGROUND OF THE INVENTION

The present invention relates to a clip for fixing an element on a structure, having at least one groove which is defined by two parallel and opposite hook-in edges, wherein the fixation clip includes a tab which is designed such that at least on one of its edges on a first plane and a second plane, which are parallel to each other, the tab can cooperate with the groove, wherein the tab includes at least one fixing means which has at least one first surface and at least one second surface, wherein the first surface extends completely on a first side, set back with respect to the first plane and in the thickness of the tab to the second plane, and wherein the second surface extends completely on a second side and protruding from the second plane to the outside of the tab and opposite the first surface, wherein the first surface and the second surface together define at least one elastically deformable region.

The invention relates to the field of the fixation of means on a structure, and in particular to the fixation of plugs, in particular electric plugs, on the structure of a road vehicle of the motor vehicle type or the like.

As is well known, the structure of a road vehicle of the motor vehicle type has a number of differently shaped openings which mostly are circular and provided to receive fixing elements, referred to as clips, and to cooperate with the same, in order to hold various accessory parts. Various types of fixation clips for fixing means on the structure of vehicles are known. These fixation clips, which in general are made of plastic materials, have a head which is formed such that it ensures the connection with the means to be fixed, and a base which is introduced into an opening of the structure with force or by blocking. This opening can be rectangular, oblong or round.

Conventionally, the plugs to be fixed have a longitudinal groove on a surface which contacts the structure, which groove opens on at least one side, has a generally T-shaped cross-section and can cooperate with a tab of the fixation clip at the level of two wings. Said fixation clip must ensure a sufficient force for holding the plug, while the force required for introducing said tab into said groove must be as small as possible.

It is often required to remove these plugs, in order to perform maintenance work, which is detrimental to the groove and/or the tab and deteriorates the holding force of the fixation clip.

In use of the vehicle, the plugs fixed by clips frequently are exposed to vibrations and abrupt accelerations, which accelerates the deterioration of the clip and/or the groove. In addition, the manufacturing tolerances of the plugs and the clips can lead to great dimensional differences between the same and cause a deterioration of the holding force produced by the clip at the plug. It is known that the plugs and the clips furthermore can be arranged at points which can be exposed to great temperature fluctuations, such as in the engine compartment, and that these plugs and these clips can be made of different kinds of materials and thus of materials with different coefficients of expansion. Thus, this leads to different thermal expansions of the two parts and hence to differences in the adjustments which additionally can lead to the deterioration of the holding force produced by the fixation clips.

The deterioration of the holding force produced by the clip can lead to the fact that a relative displacement between the fixed part and the fixation clip can be caused, which even can result in their separation.

In the prior art attempts have been made to minimize this disadvantage by forming a material protrusion with a suitable shape at the level of the tab of the clip, which is intended to cause a clamping of the clip in the groove of the plug. This design leads to very high mechanical stresses at the clip and/or the groove at the level of the excess of material and/or at the wings of the groove of the plug, which leads to fixation fractures.

SUMMARY OF THE INVENTION

The invention proposes to eliminate the disadvantages of the prior art, in order to provide for the numerous disassembly operations without damage.

For this purpose, the invention relates to a clip for fixing an element on a structure, having at least one groove which is defined by two parallel and opposite hook-in edges, wherein the fixation clip includes a tab which is designed such that at least on one of its edges on a first plane and a second plane, which are parallel to each other, the tab can cooperate with the groove, wherein the tab includes at least one first fixing means which has at least one first surface and at least one second surface, wherein the first surface extends completely set back with respect to the first plane and in the thickness of the tab to the second plane, and the second surface extends completely protruding from the second plane to the outside of the tab and opposite the first surface, wherein the first surface and the second surface together define at least one elastically deformable region, characterized in that the volume defined on the one side by the second surface and the second plane is smaller than the volume defined on the other side by the first surface and the first plane or is equal to the same.

Due to the presence of elastically deformable regions which are combined with the formation of the volume for compensating the displacement of material, the invention offers the important advantage of a considerable reduction of the permanent stresses at the fixation clip and hence the risk of cracks. With the invention it is possible to obtain a fixation with systematic backlash elimination and at the same time simplify the introduction of the fixation clip into the associated groove of the element to be fixed.

BRIEF DESCRIPTION OF THE DRAWINGS

Further features and advantages of the invention become apparent from the following detailed description of non-limiting embodiments of the invention with reference to the attached drawings, in which:

FIG. 1—schematically shows a fixation clip according to the invention from above;

FIG. 2—schematically shows the clip of FIG. 1 in an end view;—

FIG. 3—schematically shows a detail of FIG. 1;

FIG. 4—schematically shows a perspective view of the clip of FIG. 1 in the assembly configuration opposite a groove of the plug and a structure;

DESCRIPTION OF EXEMPLARY EMBODIMENTS

Figure 5:
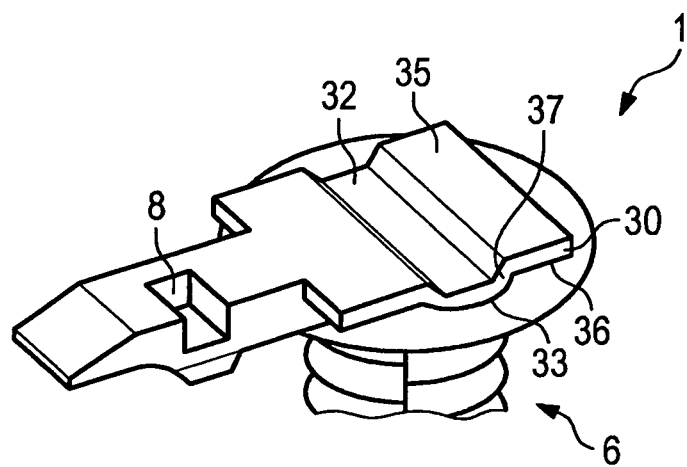
FIG. 5—schematically shows the clip of FIG. 1 in a perspective view.
Figure 6:
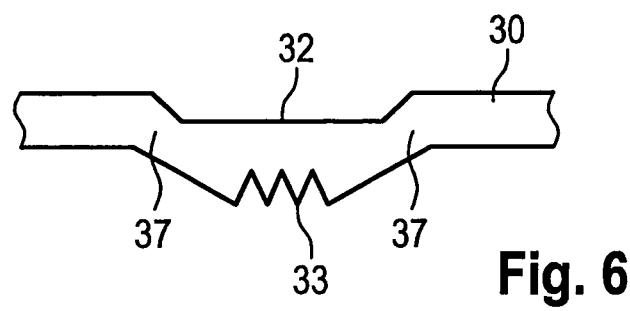
FIG. 6 and FIG. 7—schematically show two further possible variants of a deformable region of the clip according to the invention.
Figure 7:
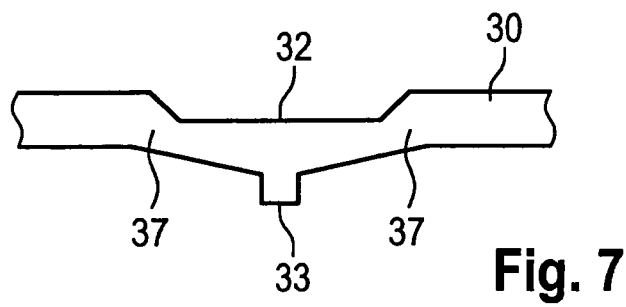

The invention relates to the field of the fixation of means, which are referred to as elements 3, on a structure 2, and in particular to the fixation of plugs, in particular of electric plugs, on the structure of a road vehicle of the motor vehicle type or the like.

The invention relates to a fixation clip 1 which is provided to ensure such fixation. This clip 1 preferably is a plug holder. A particular embodiment of the invention is illustrated in the Figures.

The fixation clip 1 includes a hook-in means 6 for fixing the same on a structure 2.

For hooking in on a structure 2 via a clip 1 according to the invention, an element 3, in particular a plug, includes at least one groove 4. The same is defined by a first hook-in edge 23 and a second hook-in edge 24, which are parallel to each other and are located opposite each other.

The clip 1 includes a tab 30 which is designed such that at least on one of its edges at the level of a first plane 35 and a second plane 36 of this tab 30, which are parallel to each other, the tab 30 can cooperate with this groove 4. The tab cooperates with the groove 4 preferably at the level of two mutually opposite and parallel edges, as can be seen in FIG. 4.

The tab 30 includes at least one first fixing means 31, which has at least one first surface 32 which extends on a first side of the tab 30, and at least one second surface 33 on the side opposite this first side. The first surface 32 extends completely set back with respect to the first plane 35 on a single side of this plane in the thickness of the tab 30 to the second plane 36. The second surface 33 extends completely protruding with respect to the second plane 36 on one side of this plane to the outside of the surface 30 and opposite the first surface 32.

The first surface 32 and the second surface 33 together define at least one elastically deformable region 37. This elastically deformable region 37 can be realized in various ways. It can be formed by the entire volume which is present between the first surface 32 and the second surface 33, or by one or more portions of this volume, for example by the regions for connecting these surfaces with the first plane 35 and the second plane 36 of the tab 30.

For this reason, a deformation which is exerted on the second surface 33 will lead to a deformation of this surface because the same is located opposite the first surface 32.

It is to be understood that the tab 30 includes a cavity on one of its surfaces, which is defined by the first surface 32 and the first plane 35, and on the opposite surface opposite this cavity a bulge which is defined by the second surface 33 and the second plane 36 and whose volume is related to the volume of this cavity. Thus, it is important that opposite each bulge a cavity is formed, which preferably has a volume 38 which is greater than a volume 39 of the bulge or corresponds to the same. When inserting the element 3 on the clip 1, the first plane 35 and the second plane 36 of the tab 30 cooperate with the first hook-in edge 23 and the second hook-in edge 24 of the groove 4, and the presence of the bulge/bulges leads to a compressive force acting on the same. Due to the fact that the elastically deformable region 37 is present, the volume of material present in the bulge is displaced towards the existing empty space represented by the cavity.

in accordance with the invention, the volume 39 defined on the one hand by the second surface 33 and the second plane 36 is smaller than or equal to the volume 38 defined on the other hand by the first surface 32 and the first plane 35, which offers the advantage that a good flexibility of the clip 1 is possible and there is no unnecessary load, wherein the volume of material displaced when mounting the element on the clip is contained in the volume 38 available in the cavity.

The maximum distance between the second surface 33 and the second plane 36 preferably is smaller than the maximum distance between the first surface 32 and the first pane 35 or is equal to the same. This provides to a distribution of the volume 39 of the bulge, which simplifies the displacement of material towards the volume 38 of the cavity.

Advantageously, the clip 1 is made of a plastic material such as polyamide or the like and has a second surface 33 whose offset with respect to the second plane 36 is between 0 and 75% of the thickness of the tab 30.

According to a configuration variant of the invention, the tab 30 includes at least one elastically deformable region 37 which is located between the first surface 32 and the second surface 33 and has a thickness which is smaller than the thickness between the first plane 35 and the second plane 36.

In a further variant, the second surface 33 includes corrugations which extend vertical to the direction of inserting the clip 1 into the element 3 to be fixed, in particular into the plug to be fixed.

In a further variant, the second surface 33 includes one or more noses on its bulge.

In a further embodiment, the clip 1 includes a sequence of elastically deformable regions 37 which are associated to a sequence of bulges which are formed by second surfaces 33, and cavities which are formed by first surfaces 32.

According to a further aspect of the invention, the clip 1 advantageously can include a second means for fixing on the plug, which is formed by a receptacle 8 lying on a surface of the clip 1 which is provided to be directed towards a bottom contained in the groove 4 of the plug. This receptacle 8 is formed such that it can cooperate with a protruding part 5 at the bottom of the groove 4. The receptacle 8 advantageously can adopt the shape of a transverse groove 8, i.e. vertical to the direction of inserting the clip 1 into the groove 4 or vice versa. This groove can open on at least one of its ends, which in this case simplifies the molding operation when this clip is obtained by molding.

When mounting the element 3 on the clip 1, the tab 30 of the clip is inserted into the groove 4 of the plug, or the groove 4 of the plug is placed on the tab 30 of the clip 1 in the direction in which the receptacle 8 first is inserted into the groove 4. The plug is shifted in direction of insertion of the clip 1, until it gets in contact with the protruding region 5, which is present in the groove 4 of the plug, in longitudinal direction. By slightly pressing in direction of translation, the end of the clip 1 which is elastic in this region is forced to yield sufficiently, so that the protrusion 5 can cooperate with the receptacle 8, which can cause a first relative blocking of the plug with respect to the clip. When inserting the tab 30 of the fixation clip into the groove 4 of the plug, the bulge of the second surface 33, which in the rest condition extends on the other side of the second plane 36 which is formed such that it cooperates with one of the hook-in edges 23 24 of the groove 4, extends towards the cavity of the first surface 32 due to the presence of the elastically deformable region or the elastically deformable regions 37, in order to provide for the complete cooperation of the clip and the groove 4. The remaining pressure load provides for permanently clamping of the clip 1 in the groove 4 and for blocking the same relative to each other.

The clip 1 includes a means 6 for hooking in on a structure 2, which is designed such that it cooperates with a corresponding opening 12 which preferably is circular and is formed in the structure. This hook-in means, which can be a known means composed of resetting barbed hooks, generally referred to as fir tree, consists of a base with an in particular cylindrical web which can be hollow and be provided with a plurality of flexible lamellae 19 on its entire length or on a part of its length, which each are oriented along an inclined plane with respect to the longitudinal middle axis of the web. Each lamella has an end portion which in the rest condition extends on the other side of the contour of the opening 12, when the web is arranged concentrically with respect to the opening 12. Fixing the clip on the holder 2 is effected in that a pressure is exerted on the hook-in means vertical to the structure and in the longitudinal axis of the web. When inserting the web into the opening 12, the flexible lamellae will yield, which get in contact with the edge of the opening, in order to be located in the contour of the opening. After inserting the web into the structure 2, the lamellae tend to return into their original position due to elasticity and thus yield into a direction of expansion, whereby they emerge from the contour of the opening 12 and the fixation clip can withstand a withdrawal.

The clip 1 preferably is made in one piece, which can be obtained by molding a generally polyimide-based plastic material which possibly is reinforced with glass fibers or contains additives which impart an increased flexibility and thereby ensure a high resistance to breakage. This embodiment merely is indicated by way of example and by no means limits the scope of the invention. Thus, the clip 1 according to the invention can have the shape of a plurality of base elements which are joined together, in order to obtain the same end piece, but for each of these elements the same materials are used, which are optimally suited for the loads occurring in use.

The invention is of course not limited to the examples illustrated and described above, which can comprise variants and modifications without departing from the scope of the invention.

The invention claimed is:

1. A fixation clip (1) for fixing an element (3), in particular a plug, on a structure (2), having at least one groove (4) which is defined by two parallel and opposite hook-in edges (23; 24), wherein the fixation clip (1) includes a tab (30) which is designed such that at least on one of its edges on a first plane (35) and a second plane (36), which are parallel to each other, the tab can cooperate with the groove (4), wherein the tab (30) includes at least one first fixing means (31) which has at least one first surface (32) and at least one second surface (33), wherein the first surface (32) forms a cavity extending from the first plane (35), only on one side of the first plane and towards the second plane (36), and wherein the second surface (33) forms a bulge extending from the second plane (36), only on one side of the second plane to the outside of the tab (30) and opposite the first surface (32), wherein the first surface (32) and the second surface (33) together define at least one elastically deformable region (37), a volume defined on the one side by the second surface (33) and the second plane (36) is smaller than a volume defined on the other side by the first surface (32) and the first plane (35) or is equal to the same.

2. The fixation clip (1) according to claim 1, wherein the maximum distance between the second surface (33) and the second plane (36) is smaller than the maximum distance between the first surface (32) and the first plane (35) or is equal to the same.

3. The fixation clip (1) according to claim 1 wherein the tab (30) includes at least one elastically deformable region (37) which is located between the first surface (32) and the second surface (33) and has a thickness which is smaller than the thickness between the first plane (35) and the second plane (36).

4. The fixation clip (1) according to claim 1, wherein the fixation clip is made of a plastic material and includes a second surface (33) whose offset with respect to the second plane (36) is between 0 and 75% of the thickness of the tab (30).

5. The fixation clip (1) according to claim 1, wherein the second surface (33) includes corrugations which extend vertical to the direction of inserting the clip (1) into the element (3).

6. The fixation clip (1) according to claim 1, wherein the second surface (33) includes one or more noses.

7. The fixation clip (1) according to claim 1, wherein the fixation clip includes a receptacle (8) which opens on one of its ends and is designed such that it can cooperate with a protrusion (5) of an element (3).

8. The fixation clip (1) according to claim 1, wherein the fixation clip includes a sequence of elastically deformable regions (37) which are associated to a sequence of bulges and cavities.

9. The fixation clip according to claim 4, wherein the fixation clip is made from polyamide.

10. A fixation clip to fix an element to a structure, comprising:
a tab having a first edge defining a first plane and a second plane parallel to the first plane, the tab having at least one fixing means, the at least one fixing means including:
a cavity defined by a first surface of the at least one fixing means, the cavity extending from the first plane towards the second plane, the cavity defining a first volume extending between the first plane and the first surface; and
a bulge defined by a second surface of the at least one fixing means, the bulge extending from the second plane to the second surface of the at least one fixing means, the bulge defining a second volume extending between the second plane and the second surface that is smaller than or equal to the first volume of the cavity,
the first surface and the second surface of the at least one fixing means defining at least one elastically deformable region.

\* \* \* \* \*